Dec. 7, 1937.   S. R. OLDHAM   2,101,447
THERMOSTATIC SPEED CONTROL
Filed Feb. 28, 1934
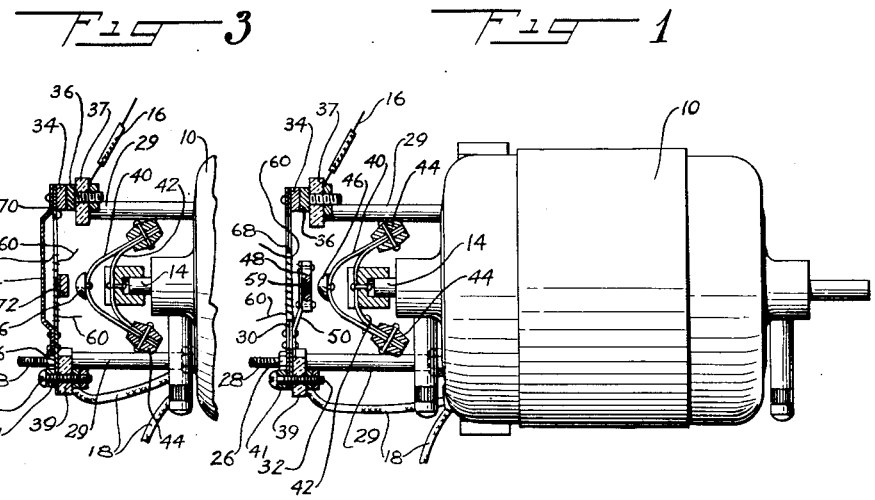
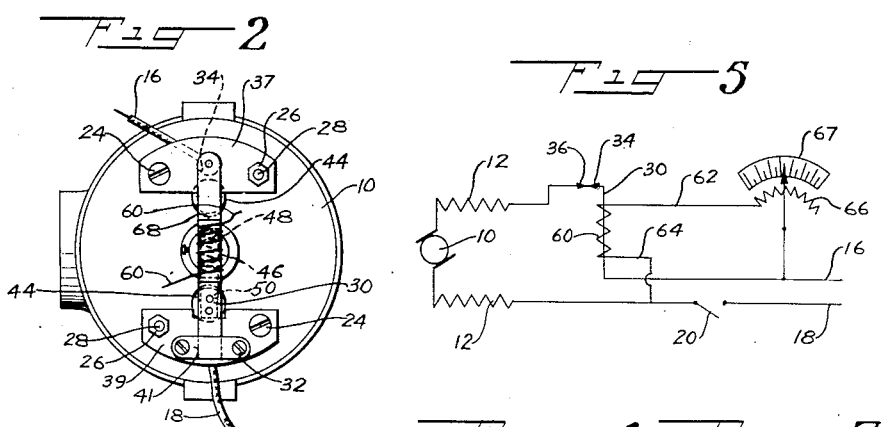
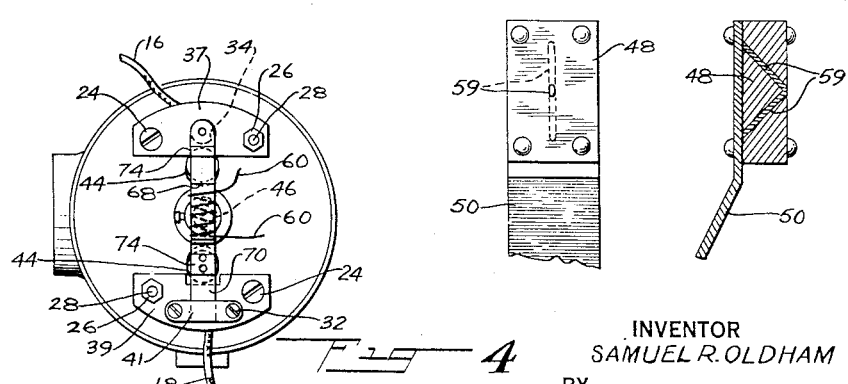
INVENTOR
SAMUEL R. OLDHAM
BY
ATTORNEY Patented Dec. 7, 1937

2,101,447

UNITED STATES PATENT OFFICE 2,101,447

THERMOSTATIC SPEED CONTROL

Samuel R. Oldham, Elizabeth, N. J., assignor, by mesne assignments, to Union Carbide and Carbon Corporation, a corporation of New York Application February 28, 1934, Serial No. 713,248

17 Claims. (Cl. 200—80)

This invention relates to the control of an electric motor and of the work produced thereby; and more especially it involves provisions for controlling the current flowing through a power circuit to an electric motor, by the controlled use of a readily regulatable, relatively small, electric current, and regulating from a more or less remote point the motor speed or the work produced by the motor in accordance with the current flowing through this last-named circuit.

While the invention has a very wide field of usefulness,—it is especially adapted for the regulation of the speed of small electric motors having power ratings around 1 or 2 horsepower and below,—such as those employed in connection with automatic welding and cutting apparatus now in wide use in the industries.

Heretofore automatic governors of various types have been developed for the speed control of electric motors. Such devices were operative to cut off the motor upon the attainment of a selected speed. When in the past it became necessary or desirable to change the motor speed at which a motor governor was actuated, this has generally necessitated the changing of parts. Considerable time and labor are involved in this replacement of parts.

Among the more important objects of the present invention are: to provide in novel manner for the ready setting and resetting of a motor governor from a point remote from the motor, to provide for selected maximum motor speeds, to provide in novel manner for the instantaneous adjustment of a motor governor for controlling the motor speed under either light load or heavy load conditions, without stoppage of the motor or interruption of the power current; and to provide a calibrated, quick-acting, motor speed governor-regulating device.

Referring now to the accompanying drawing,

Fig. 1 is a side elevation of an electric motor embodying the invention, parts being shown in section;

Fig. 2 is an end view of the apparatus shown in Fig. 1;

Fig. 3 is a fragmental view in side elevation of another embodiment of the invention;

Fig. 4 is an end view of the apparatus shown in Fig. 3;

Fig. 5 is a schematic wiring diagram of the various circuits; and

Figs. 6 and 7 are fragmentary front and side elevations, respectively, of a self-lubricating circuit-breaking member.

In the drawing, the numeral 10 designates an electric motor which may be of any well-known type but preferably is a motor of the type designed for operation on either direct or alternating current and widely known as a universal motor. The motor 10 is provided with the usual stationary field windings 12, armature and shaft 14, and a commutator and commutator brushes (not shown). The motor field and armature windings are connected in an electric power circuit composed of the conduits 16, 18,—the circuit having therein a main switch 20.

The main power circuit also includes a movable connector 30 of a resilient, conductant metal such as steel, or a bimetallic member, as hereinafter described. The connector 30 is free at one end; and its other end is secured between an insulating plate 39 and a cross member 41 carried thereby.

The plate 39, and a second insulating plate 37 are respectively supported upon the motor case by posts and are locked against shoulders on two of these posts by nuts 26, 26, carried by projecting studs 28, 28, forming a part of the posts.

Each stud 28 has a hexagon portion at the motor case for convenience in screwing these posts into tapped holes in the motor end plate. The remaining posts comprise machine screws 24 extending through the insulating plates 37, 39, and screwed into tapped holes in the motor end plate. Metal sleeves 29 space the said plates from the motor. The projecting ends of the studs 28, 28, are used for mounting a cover (not shown) over the control unit.

A metal contact 34 is carried upon the free end of the connector 30 and is yieldingly urged by the resilient member 30 toward a similar contact 36 mounted upon the insulating plate 37. The respective contacts 34, 36 are insulated from the motor casing by the insulating plates 37, 39. The arrangement of parts is such that at all times the contact 34 of the connector 30 is yieldingly urged towards pressing engagement with the contact 36.

For the purpose of breaking this engagement and opening the electric circuit under certain conditions of motor operation, there is provided at one end of the motor shaft 14, a speed-responsive device comprising a pair of bowed spring leaves 40, 42, that are spaced along the axis of the shaft and extend outwardly therefrom. The outer ends of the leaf springs are connected together and have weights 44 secured thereto. The weights 44 are normally urged outwardly under the influence of centrifugal force when the shaft 14 is rotated, so as to displace the mid-portion of the spring 40 away from the spring 42. A wear-member or button 46, of suitable material such as pressed fiber board or metal, is mounted mid-way of the spring 40.

A flat wear-plate 48 of pressed fibre or other electric-insulating material is rigidly connected with the resilient connector 30 at a point opposite its free end by means of an offset supporting member 50. The plate 48 is disposed in the longitudinal path of movement of the button 46 when the motor 10 is in operation; but the former is spaced from the button at all times excepting when by reason of a high-speed motor operation the button moves into pressing engagement with the plate.

For regulating the motor speed at which the device functions to cut off the line current to the motor, there is provided a coil of fine heater wire 60 encircling the connector member 30 throughout the major portion of the length of the latter,—the wire 60 being arranged in a heating circuit comprising the leads 62, 64 and having therein a rheostat or variable transformer 66. The heating circuit is in parallel with the main power circuit.

Thin sheets or tubes 68 of mica or other insulating material separate and insulate the heating coil 60 from the connector 30; or the heater wire may be coated or wrapped with an insulating material such as asbestos cement. Thus the heating current flowing through the coil 60 is at all times insulated from the power current flowing through the connector 30. The function of the heater wire 60 is to heat the connector and cause distortion thereof.

In the preferred form of the invention, the connector 30 is a thermo-responsive device in the nature of a bimetallic strip member of well-known construction,—being made of joined strips of metal of different coefficients of expansion, so that heating the member will cause it to bend in one direction, and cooling it will cause it to bend in the opposite direction. By varying the amount of heat imparted to the connector 30 by the heater element 60, the degree of distortion or of curvature can be correspondingly varied. The member 30 is so mounted that heating of the same by the heating current produces a curvature moving the wear plate 48 toward the rotating button 46. By adjusting the heating current by means of the rheostat 66, it is possible to hold the wear plate in any selected position with respect to the button, so as to be actuated by the button at a selected motor speed.

In operation, when the motor speed becomes sufficiently high to move the button against the wear plate 48, the force applied upon the bimetallic strip through the rigid member 50 overcomes the pressure of the spring contactor pressing the contact 34 upon contact 36. The resultant separation of these contacts breaks the power circuit, and the motor speed is reduced until it is sufficiently low that the button 46 releases the plate 48, at which time the power circuit to the motor is again closed.

By providing a graduated scale 67 for the rheostat 66, and by calibrating the same in terms of the maximum possible speed of the motor on work done thereby at the various rheostat settings, it is readily possible to regulate at will the maximum speed of a motor equipped with the present invention, or the maximum work done thereby.

Heretofore, the life of a wear plate 48 generally has been rather short, due to excessive wear induced by frictional pressure of the rapidly rotating button 46. This has here been substantially eliminated or reduced to a minimum by the provision of sticks or bodies 59 of solid lubricant extending through the plate in a direction toward the point of contact of the button therewith. Ordinary sticks of graphite such as the leads for lead pencils are eminently suitable for the purpose. Figs. 1, 6 and 7 show two of these graphite sticks 59 extending within the wear plate 48, but more or less may be employed as required.

Fig. 3 illustrates another form of the invention in which a rigid bar or strip of brass, nickel, or other suitable metal 70 carrying the contact 34 is substituted for the bimetallic element 30. In this modification the wear plate 72 is secured directly to the mid-portion of the bar 70; and both ends of the bar are rigidly interconnected by means of a strong metallic reinforcing anchoring or bridge member 74. The purpose of the latter is to force the bar 70 to belly inwardly upon expansion thereof under the action of the heating coil 60, while limiting longitudinal movement of the bar. Enough initial curvature is provided in the bar 70 to insure that the bellying action of the latter will be in the direction toward the button 46. The member 74 is preferably at least as wide as the expansible bar 70, and is rigidly connected with the said bar at its lower end,—the bar being carried upon the members 32 and associated parts.

If desired, a perforated or otherwise ventilated housing for the automatic cutout and speed regulator may be provided on the motor. Such housing (not shown) may be of light sheet metal or of electric insulating material such as bakelite, and may be readily detachable from the motor. It is desirable in any case to provide for the ready escape of heat from the heating element after the heating current is reduced or cut off, so as to reduce to a minimum the time lag between the current change in the heating circuit and the resultant adjustment of the motor speed. The rotating shaft and the governor parts facilitate circulation of the air around the heating element during motor operation.

In the operation of the device, the electric current flowing in the heater circuit is regulated by the variable resistance 66, to heat the expansible element to a temperature known to produce a desired amount of curvature therein and, upon overcoming the yielding resistance of the said member, to break the power circuit at the contacts 34, 36 under pressure from the governor button 46 when the latter is forced against it due to a motor speed higher than a desired maximum. When the motor speed has again fallen to a suitable point, the said pressure of the button 46 is released, and the member 30 (or 70) is again free to move to bring the member 34 into contact with the member 36 and reestablish the power circuit through the motor. The variable resistance preferably is disposed at a convenient point more or less remote from the motor itself, for the adjustment of motor speeds from such point.

The invention is susceptible of modification within the scope of the appended claims.

I claim:

1. In a speed governor for a motor, a fixed contact, a movable contact, and a rotatable member adapted for controlling an electric power circuit, means movable longitudinally of the rotatable member for moving the movable contact for breaking the circuit in response to changes in the rotational speed of the said member, and means for selectively regulating the speed of the rotatable member at which the last-named means becomes operative, the said regulating means comprising a thermomotive member adapted to assume various curvatures in accordance with variations in heat imparted thereto, and a heating member associated with the latter and disposed in an electric heating circuit.

2. In a speed governor for a motor, a pair of relatively movable contacts and a rotatable member adapted for controlling an electric power circuit, means connected with and movable longitudinally of the rotatable member for moving one of the contacts with respect to the other for breaking the circuit in response to changes in the rotational speed of the said member, and means for selectively regulating the speed of the rotatable member at which the last-named means becomes operative, the said regulating means comprising a bimetallic member adapted to assume various curvatures in accordance with variations in heat imparted thereto, and a heating member associated with the latter and disposed in an electric heating circuit.

3. In a speed governor for a motor, a pair of contacts and a rotatable member adapted for controlling an electric power circuit, means connected with the rotatable member and movable longitudinally thereof for moving one of the contacts with respect to the other for breaking the circuit in response alone to changes in the rotational speed of the said member, and means for selectively regulating the speed of the rotatable member at which the last-named means becomes operative, the said regulating means comprising a thermomotive member adapted to assume various curvatures in accordance with variations in heat imparted thereto, and a heating member associated with the latter and disposed in an electric heating circuit containing a calibrated variable resistance.

4. In a speed governor for a motor, a pair of contacts and a rotatable member adapted for controlling an electric power circuit, means for moving one of the contacts with respect to the other for breaking the circuit in response to changes in the rotational speed of the said member, and means for selectively regulating the speed of the rotatable member at which the last-named means becomes operative, the said regulating means comprising a thermomotive member adapted to assume various curvatures in accordance with variations in heat imparted thereto, a heating member associated with the latter, a wear-resistant member operatively interposed between the thermomotive member and the said contact-moving means and adapted to be engaged by the latter for breaking the power circuit, and lubricating means mounted in the wear-resistant member in the path of travel of the movable contact.

5. In a speed governor for a motor, a pair of contacts and a rotatable member adapted for controlling an electric power circuit, means for moving one of the contacts with respect to the other for breaking the circuit in response to changes in the rotational speed of the said member, and means for selectively regulating the speed of the rotatable member at which the last-named means becomes operative, the said regulating means comprising a thermomotive member adapted to assume various curvatures in accordance with variations in heat imparted thereto, a heating member associated with the latter, a wear-resistant member operatively interposed between the thermomotive member and the said contact moving means and adapted to be engaged by the latter for breaking the power circuit, and lubricating means including sticks of graphite mounted in the wear-resistant member and having an end of each stick intercontacting at the surface of the said member adapted to be engaged by the contact-moving means.

6. The combination of a motor governor having a member adapted to travel in a preselected path and to control an electric power circuit connected with the motor and having therein a thermomotive member disposed in the path of travel of the said governor member, and means associated with the said thermomotive member and adapted to adjust the position of the latter in the said path.

7. The combination of a motor governor having a member adapted to travel in a preselected path and to control an electric power circuit connected with the motor and having therein a thermomotive member disposed in the path of travel of the said governor member, and remote control means associated with the said thermomotive member and adpted to adjust the position of the latter in the said path.

8. The combination of a motor governor having a member adapted to travel axially in a preselected path and to control an electric power circuit connected with the motor and having therein a thermomotive member disposed in the path of travel of the said governor member, and heating means associated with the said thermomotive member and adapted to adjust the position of the latter in the said path.

9. The combination of a motor governor having a member adapted to travel in a preselected path and to control an electric power circuit connected with the motor and having therein a thermomotive member disposed in the path of travel of the said governor member, and means including an electric heating circuit associated with the said thermomotive member and adapted to adjust the position of the latter in the said path.

10. The combination of a motor governor having a member adapted to travel axially in a preselected path and to control an electric power circuit connected with the motor and having therein a thermomotive member disposed in the path of travel of the said governor member, and means including an electric heating circuit having therein a variable resistance associated with the said thermomotive member and adapted to adjust the position of the latter in the said path.

11. The combination of a motor governor having a member adapted to travel lineally in a preselected path and to control an electric power circuit connected with the motor and having therein a thermomotive member disposed in the path of travel of the said governor member, and means including an independent calibrated heating circuit having therein a variable resistance associated with the said thermomotive member and adapted to adjust the position of the latter in the said path.

12. In a circuit maker and breaker, a pair of contacts in an electric power circuit, resilient means in the said circuit for moving one of said contacts toward the other, a rotatable element, means opposing the first-named means in response to changes in the angular speed of said rotatable element, the said resilient means comprising a thermomotive element adapted to be deformed at a mid-portion thereof for regulating the speed of the rotatable element at which the said opposing means functions, a bridge member rigidly interconnecting the respective ends of the said element, and a heating element operatively associated with the thermomotive element and arranged in a substantially independent electric circuit.

13. In a circuit maker and breaker, a pair of contacts in an electric power circuit, resilient means for moving one of said contacts toward the other, a rotatable element, means opposing the first-named means in response to changes in the angular speed of said rotatable element, the said resilient means comprising a thermomotive element in the electric power circuit with the rotatable element, the said element having its ends rigidly secured and being adapted to be deformed at a mid-portion thereof for regulating the speed of the rotatable element at which the said opposing means functions, a heating element operatively associated with the thermomotive element and arranged in a substantially independent electric circuit, and means for independently regulating the current flow through the said heating circuit.

14. The combination of a rotor, a motor governor having parts carried by the rotor, including a member adapted to travel axially of the rotor in a preselected path and to control an electric power circuit connected with the motor and having therein a thermomotive member disposed in the path of travel of the said axially-movable member, and heating means associated with the thermomotive member and adapted to adjust the position of the latter in the said path.

15. The combination of a motor governor having a member adapted to travel in a preselected lineal path and to control an electric power circuit connected with the motor and having therein a bimetallic thermomotive member disposed in the path of travel of the said governor member, and an electric heating circuit associated with the said bimetallic member and adapted to adjust the position of the latter in the said path.

16. An electric motor governor comprising a pair of cooperating contacts operable to open and close the current supply circuit of an electric motor; a device, responsive to the speed of said motor, operatively connected to one of said contacts; a thermo-responsive device operatively connected to the other of said contacts; and adjustable means for varying the heat applied to said thermo-responsive device.

17. An electric motor governor comprising a pair of cooperating contacts operable to open and close the current supply circuit of an electric motor; a device, responsive to the speed of said motor, operatively connected to one of said contacts; a thermo-responsive device operatively connected to the other of said contacts; electrical means for heating said thermo-responsive device; and means for varying the heat applied by such electrical heating means.

SAMUEL R. OLDHAM.